United States Patent [19]

O'Neill et al.

[11] 4,399,882
[45] Aug. 23, 1983

[54] CONTROL MECHANISM FOR A DUAL HYDROSTATIC TRANSMISSION VEHICLE DRIVE SYSTEM

[75] Inventors: Michael J. O'Neill, Mayville; Peter F. Brautigam, Kewaskum; David K. Stricker, Juneau, all of Wis.

[73] Assignee: Deere & Company, Moline, Ill.

[21] Appl. No.: 280,431

[22] Filed: Jul. 6, 1981

[51] Int. Cl.³ .............................................. B62D 11/00
[52] U.S. Cl. ............................. 180/6.48; 74/471 XY; 180/333
[58] Field of Search ............................... 180/6.48, 333; 74/471 XY

[56] References Cited

U.S. PATENT DOCUMENTS

| | | | |
|---|---|---|---|
| 3,469,381 | 9/1969 | Burrough et al. | 56/209 |
| 3,707,887 | 1/1973 | Day | 74/552 |
| 3,810,517 | 5/1974 | Hurlburt et al. | 180/246 |
| 3,882,679 | 5/1975 | Williamson | 180/6.48 |
| 4,090,411 | 5/1978 | Albright et al. | 74/471 XY |

Primary Examiner—Joseph F. Peters, Jr.
Assistant Examiner—Kenneth R. Rice

[57] ABSTRACT

A transmission control mechanism for a vehicle having a dual hydrostatic transmission vehicle drive system having a first and second lever mounted to respective displacement control rods of transmission pump units. A cross member communicates with the levers via connecting rods. A steering column is mounted to the cross member. The steering column is mounted in the vehicle such that it can experience simultaneous rotational and pivotal motion. Pivoting of the steering column causes the pump units to displace with a constant relative displacement, and rotation of the steering column causes the pumps to displace with a differential relative displacement.

4 Claims, 6 Drawing Figures

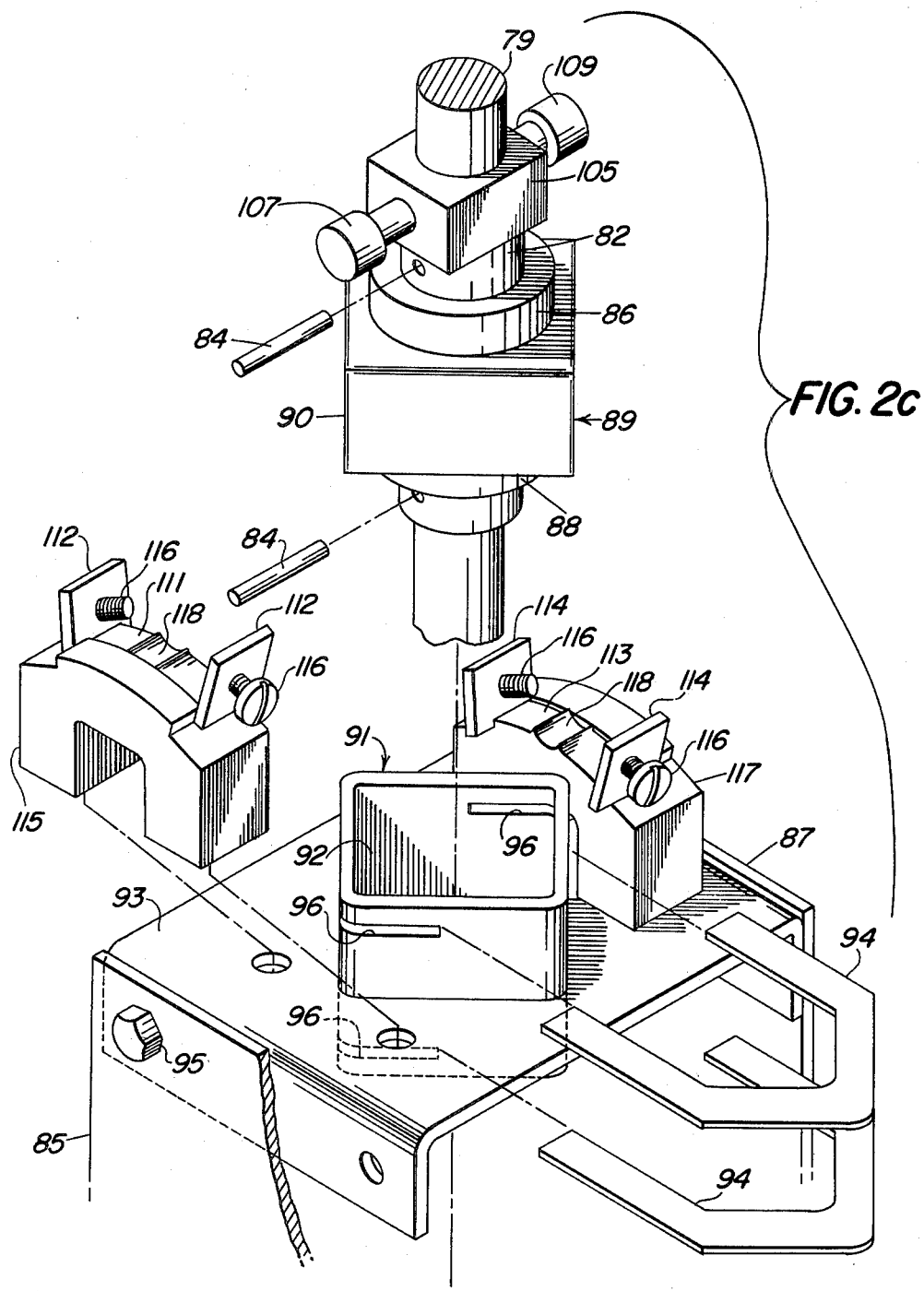

4,399,882

CONTROL MECHANISM FOR A DUAL HYDROSTATIC TRANSMISSION VEHICLE DRIVE SYSTEM

BACKGROUND OF THE INVENTION

This invention relates to control mechanism for vehicles having a dual hydrostatic drive system.

Vehicles such as skid steer loaders and some lawn and garden tractors utilize dual hydrostatic transmission drive systems. By independent operation of the transmission drives, the dual transmission system can be used not only for vehicle drive but also vehicle steering. Conventional control mechanism for independent operation of the transmission drives have a relative high cost due to their complexity.

SUMMARY OF THE INVENTION

It is an object of the present invention to disclose a control mechanism for a vehicle having a dual hydrostatic transmission system. It is a further object of the present invention to present a control mechanism for independent but cooperative operation of the transmissions. It is a still further objective of the present invention to present a control system which has a relative reduced cost.

A first and second pump unit of respective hydrostatic transmissions are mounted in colinear opposite alignment. Each pump has a pump displacement control rod extending therefrom. A first lever is mounted to the control rod of the first pump and a second lever is mounted to the control of the second pump. A cross member communicates with the first and second levers via connecting rods. A steering column is mounted to the cross member and is rotatably and pivotally mounted in the vehicle. Pivoting of the steering column causes the pump units to displace with a constant relative displacement, and rotation of the steering column causes the pump units to displace with a differential relative displacement.

DETAILED DESCRIPTION OF THE PREFERRED EMBODIMENT

Figure 1:
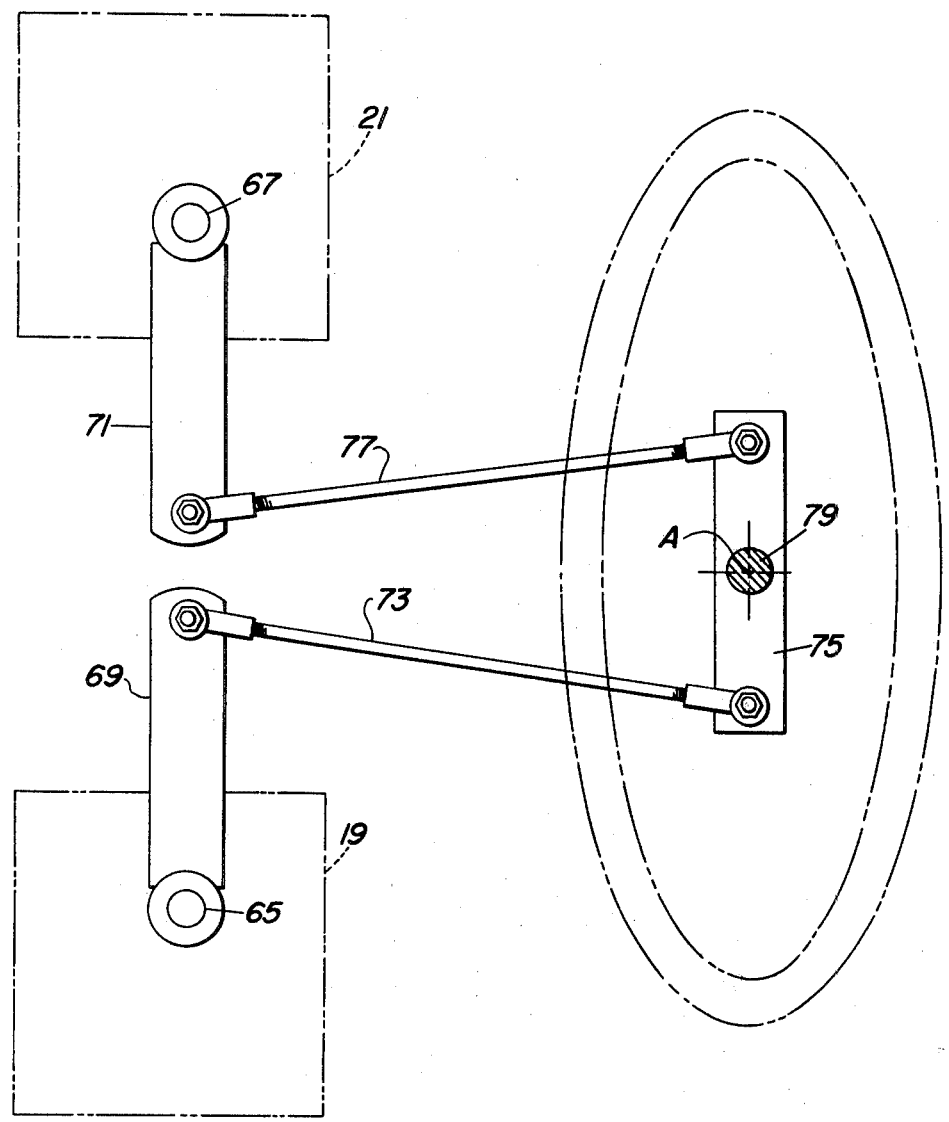
FIG. 1 is a schematic of a pump unit displacement control system in accordance with the present invention.

Referring to FIG. 1, pump units 19 and 21 of a respective hydrostatic transmission are mounted in a vehicle (not shown) in any conventional manner. Each pump unit 19 and 21 has a displacement control shaft 65 or 67, respectively, for independently controlling the displacement of the respective pumps. A first lever 69 is fixably mounted to the displacement control shaft 65 by any conventional means and a second lever 71 is fixably mounted by any conventional means to the pump displacement control shaft 67. The levers 69 and 71 are aligned colinearly and directed inwardly, which corresponds to a neutral pump position. A first connecting rod 73 at one end is pivotally mounted to the other end of the first lever 69 by any conventional means. The other end of rod 73 is pivotally mounted to one end of a cross member 75 by any conventional means. A second connecting rod 77 at one end is pivotally mounted by any conventional means to the other end of second lever 71. The other end of rod 77 is pivotally mounted at its other end by any conventional means to the remaining end of cross member 75. Located approximately at the longitudinal center of cross member 75, is a handled steering column 79 which extends generally perpendicular from cross member 75. The steering column 79 is mounted to the carrying vehicle such that it can be pivoted about a point B in a fore-and-aft direction and rotated about the centerline A of the steering column 79 in a manner to be subsequently described (refer to FIGS. 1, 3a, and 3b).

Figure 2A:
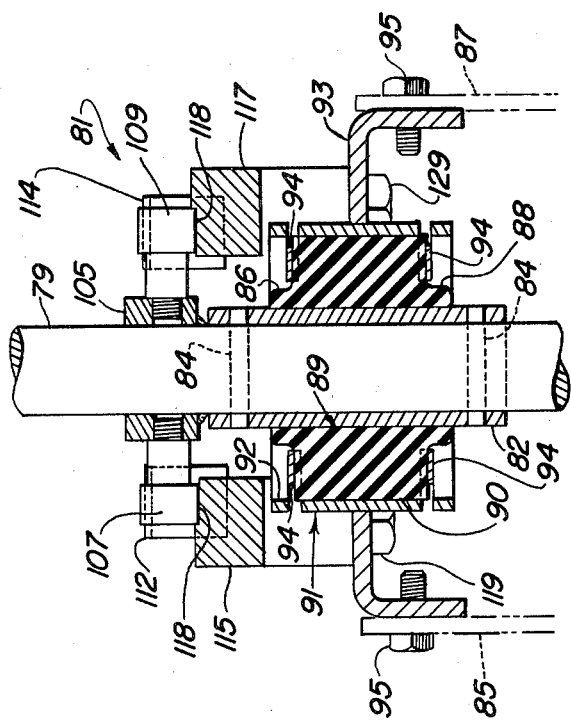
FIG. 2 is a sectioned elevational view of a steering column mounting arrangement.
FIG. 2b is a side elevational view of the steering column mounting arrangement.
FIG. 2c is an exploded view of the steering column mounting arrangement.
Figure 2B:
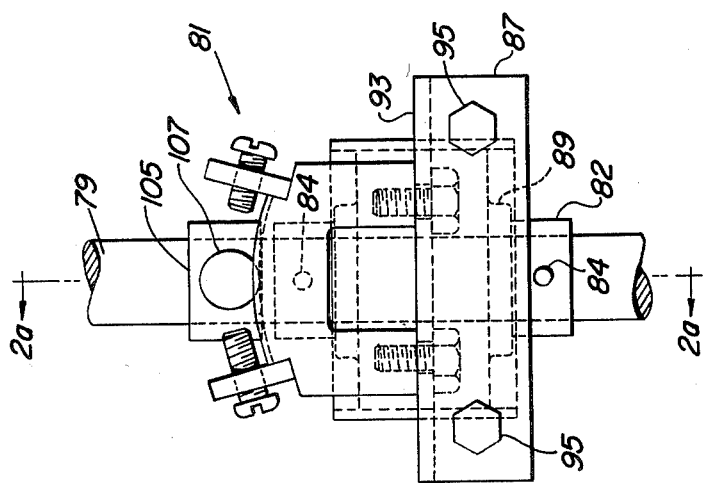

Now referring to FIGS. 2a, 2b, and 2c, steering column 79 is shown to be mounted in a mounting assembly, generally indicated as 81. The assembly 81 in turn is fixably mounted to a vehicle console having side walls 85 and 87. The mounting assembly 81 includes a generally cylindrical member 82 sized to fit around a portion of steering column 79. A plurality of pins 84 are pressed in the steering column 79 and member 82. An elastomer member 89 is bonded around a portion of the outer surface of member 82. The elastomer member 89 has three longitudinally extending sections. The first and third sections 86 and 88, respectively, each having a generally circular cross section, and a second section 90 between the first and third sections has a generally rectangular cross section. The elastomer member 89 is pressed into a generally rectangular housing 91 such that the outer surface of elastomer section 90 presses against the inner walls 92 of housing 91. Retaining pins 94 are placed in and journeys through a slot 96 in house 91. The pins 94 assume an abutting relationship to the top and bottom of section 90 of elastomer member 89 to restrain motion of member 89 with the housing 91. The housing 91 is fixably mounted to a mouting plate 93 such that the steering column 79 has a generally vertical extension. The mounting plate 93 is fixably mounted to a vehicle console sidewalls 85 and 87 by any conventional means such as bolts 95.

A mounting member 105 is fixably mounted by any conventional means such as welding to the steering column 79. Rotatably mounted, by any conventional means to opposite ends of member 105 are spindles 107 and 109. Aligned just beneath the spindle 107 is a first support member 115 fixably mounted to the mounting plate 93 by any conventional means such as by bolts 119. Along the top surface of member 115 is a slightly convexed recessed surface 111 extending longitudinally therealong, spindle 107 riding thereon. In like manner, a second support member 117 is mounted beneath spindle 109 such that spindle 109 rides on a slightly convexed recessed surface 113 extending longitudinally atop mounting member 117. Mounting member 117 is fixably mounted to mounting plate 93 by screw 129. Fixably mounted to support member 115 by any conventional means, such as welding, at each longitudinal end of surface 111 is a member 112. In like manner, member 114 is mounted by any conventional means to support member 117. Extending through members 112 and 114 are screws 116. Each surface 111 and 113 has a concaved niche 118 therein sized to assume a partial mating fit with respective spindles 107 and 109. The niches 118 are strategically located to conform to the neutral position of pumps 19 and 21.

Figure 3A:
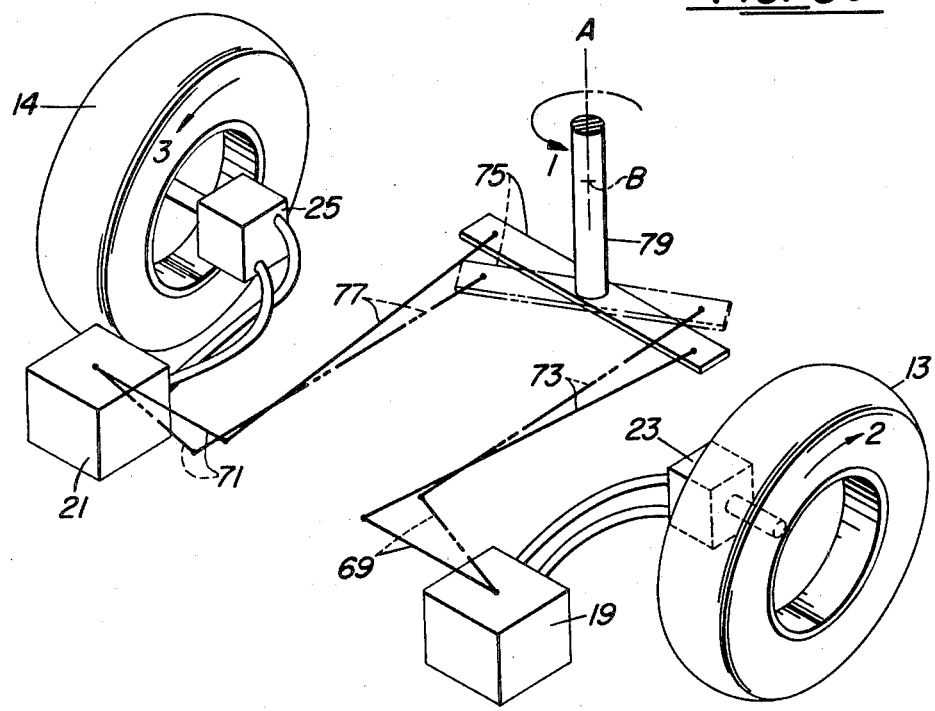
FIG. 3a is a schematic of the pump displacement steering arrangement for causing the vehicle to make a left-hand turn.
Figure 3B:
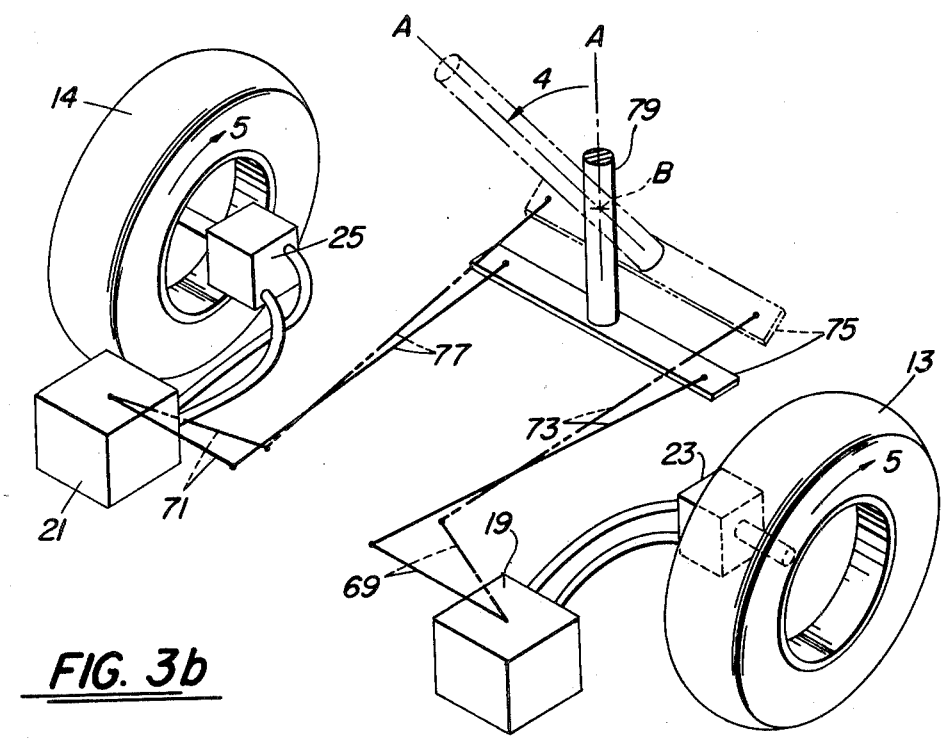
FIG. 3b is a schematic of the pump displacement control for causing forward motion of the vehicle.

Referring to FIGS. 3a and 3b, it is observed that rotation of the steering column 79 in the direction of arrows will cause the cross member 75 to pivot about the centerline A causing the linkage system of pumps 19 and 21 to go in opposite directions from the neutral position, thereby communicating to wheels 13 and 14 via motors 23 and 25, respectively, different rotational directions as indicated by respective arrows 2 and 3. Referring to FIG. 3b, we see that movement of the steering column 79 in the aft direction as indicated by arrow 4 causes the linkage to displace equal distance in the same direction thereby causing the wheel to rotate in the direction indicated. Other vehicle maneuvers are therefore evident.

It is observed that by moving the steering column 79 forward and aft, the elastomer member 89 provides a resisting load. The resistive load increases with increased displacement of steering column 79. When the moving force is removed, the resistive loads return the steering column 79 to a neutral position. Also, in like manner, rotation of the steering column 79 is resisted by elastomer member 88 as transmitted by member 82 and pin 84.

It is further observed that when steering column 79 is in its forward or rearwardmost position corresponding to pumps 19 and 21 maximum displacement, i.e., maximum speed, in order to then make a right or left turn, the placement of members 112 and 114 and associated screw 116 requires one wheel 14 or 13 to slow down relative to the other wheel thereby contributing to better operator control during turns.

The afore description speaks to the preferred embodiment of the present invention and should not be viewed as limiting. The full scope of the present invention is defined by the following claims.

I claim:

1. In a vehicle having a dual hydrostatic transmission drive system, said dual hydrostatic transmission including first pump and motor units and second pump and motor including first pump and motor units and second pump and motor units for independent operation of said vehicle's drive wheels, said first and second pump units have a respective displacement control shaft extending from said pump units for independent displacement said respective pump units, a control mechanism comprising: a first lever fixably mounted to said first pump unit's control shaft; a second lever fixably mounted to said second pump unit's control shaft; a cross member having a generally horizontal orientation; a first connecting rod pivotally mounted to said first lever and pivotally mounted to one end of said cross member; a second connecting rod pivotally mounted to said second lever and pivotally mounted to the outer end of said cross member; a steering column fixably mounted to such cross member and extending generally vertically therefrom; support means for supporting said steering column, and allowing said steering column to be pivoted about said support means in a forward and rearward direction and allowing rotation of said steering column about the longitudinal centerline of such steering column, including, a first member having a generally cylindrical shape placed around a portion of said steering column; a plurality of pins fixably mounted in and extending through said steering column and first member; an elastromeric member having a generally cylindrical shape fixably mounted around a portion of said first member; housing open at opposing ends having said elastromeric member fixably mounted therein such that said steering column extends through said housings open ends; first means for fixably mounting said housing in said vehicle, whereby pivoting of said steering column causes said pump units to displace with a constant relative displacement, and rotation of said steering column causes said pump units to displace with a differential relative displacement.

2. A control mechanism as claimed in claim 1 further including means for selectively limiting the degree of forward, rearward, and rotational motion of said steering column.

3. A control mechanism as claimed in claim 2 wherein said means for selectively limiting motion of said steering column comprises: a mounting member fixably mounted to said steering column such that said steering column extends vertically therethrough; a plurality of spindles rotatably mounted to said mounting member in opposite transverse alignment; a plurality of support members fixably mounted to said first means such that a respective one of said spindles rides on a convexed recessed surface atop said support member; a plurality of second members fixably mounted to said support means adjacent to said convexed surface such that a respective one of said spindles is located therebetween; a plurality of screws, one of said screws extending through and adjustably mounted in a respective second member whereby motion of one of said spindles is restricted by said screws.

4. A support means for a rod-like member to allow said rod-like member to experience a limited degree of movement in a forward, rearward and rotational motion, comprising;
(a) a rod-like member;
(b) a first member having a generally cylindrical shape placed around a portion of said rod-like member;
(c) a plurality of pins fixably mounted in and extending through said rod-like member and first member;
(d) an elastomeric member fixably mounted around a portion of said first member;
(e) a housing open at two opposing end having said elastomer member fixably mounted therein, such that said rod-like member extends through said housing's open ends;
(f) a plate having said housing mounted therein such that said rod-like member has a generally vertical extension;
(g) a mounting member fixably mounted to said rod-like member such that said rod-like member extends generally vertically therethrough;
(h) a plurality of spindles rotatably mounted to said mounting member in opposite transverse alignment;
(i) a plurality of support members fixably mounted to said plate such that a respective one of said spindles rides on a convexed recessed surface atop said support member;
(j) a plurality of second members fixably mounted to said support means adjacent to said convexed surface such that a respective one of said spindles is located therebetween; and,
(k) a plurality of screws, one of said screws extending through and adjustably mounted in a respective second member whereby motion of one of said spindles is retracted by said screw.

* * * * *

UNITED STATES PATENT AND TRADEMARK OFFICE
CERTIFICATE OF CORRECTION

PATENT NO. : 4,399,882

DATED : 23 August 1983

INVENTOR(S) : Michael J. O'Neill, Peter F. Brautigam, David K. Stricker

It is certified that error appears in the above-identified patent and that said Letters Patent is hereby corrected as shown below:

Column 4, line 43, delete "end" and insert -- ends --.

Signed and Sealed this

Thirtieth Day of October 1984

[SEAL]

Attest:

GERALD J. MOSSINGHOFF

Attesting Officer     Commissioner of Patents and Trademarks